United States Patent
Ulrich

(10) Patent No.: US 8,474,711 B2
(45) Date of Patent: Jul. 2, 2013

(54) INTERACTIVE CUSTOMER SHOPPING CART

(75) Inventor: Richard Ulrich, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 154 days.

(21) Appl. No.: 12/968,262

(22) Filed: Dec. 14, 2010

(65) Prior Publication Data

US 2011/0140380 A1      Jun. 16, 2011

Related U.S. Application Data

(60) Provisional application No. 61/287,065, filed on Dec. 16, 2009.

(51) Int. Cl.
*G06K 15/00*          (2006.01)

(52) U.S. Cl.
USPC .......................................... 235/383; 235/380

(58) Field of Classification Search
USPC ............... 235/375, 383, 382, 380, 382.5, 492
See application file for complete search history.

(56) References Cited

U.S. PATENT DOCUMENTS

| | | | |
|---|---|---|---|
| 8,095,426 B2 * | 1/2012 | Adelman et al. | 705/26.1 |
| 2008/0243626 A1 * | 10/2008 | Stawar et al. | 705/23 |
| 2009/0033491 A1 * | 2/2009 | Saunders | 340/568.5 |
| 2011/0266338 A1 * | 11/2011 | Babcock et al. | 235/375 |
| 2012/0123826 A1 * | 5/2012 | French et al. | 705/14.1 |

* cited by examiner

*Primary Examiner* — Thien M Le
(74) *Attorney, Agent, or Firm* — Dentons US LLP

(57) ABSTRACT

An interactive shopping system, apparatus and methods are provided for use at a brick-and-mortar merchant location. The interactive shopping system includes a basket for holding items selected by a shopper, and a unique identifier for the basket. An input device is associated with said basket to obtain information regarding specific items as they are placed in the basket. A point of sale system is associated with the input device to collect information obtained from the input device, associate that information with the unique identifier for the basket, and complete a purchase transaction for all items located in the basket at checkout.

38 Claims, 2 Drawing Sheets

INTERACTIVE CUSTOMER SHOPPING CART

CROSS-REFERENCE TO RELATED APPLICATION

This application is a NONPROVISIONAL and claims the benefit of the filing date of U.S. Provisional Application No. 61/287,065, entitled "Interactive Customer Shopping Cart," filed Dec. 16, 2009, and incorporated herein by reference.

FIELD OF THE INVENTION

The present invention relates generally to consumer tools for use while shopping at a "brick-and-mortar" (i.e., physical shopping location) retailer, wholesaler, or other sales/merchant location. More specifically, the present invention is concerned with an interactive customer shopping cart, basket or other merchandise transportation apparatus (referred to generally herein as a "shopping cart", "cart" and/or "basket"), for use at a brick-and-mortar retailer, wholesaler, or other sales/merchant location.

BACKGROUND OF THE INVENTION

It has long been a general practice for a consumer to use a shopping cart or basket provided by a merchant while shopping for goods at the merchant's brick-and-mortar location. More recently, merchants have begun utilizing more advanced technologies to offer additional tools that enhance a consumer's shopping experience and many of which also benefit the merchant in such ways as providing increased security and/or improved inventory management.

For example, U.S. Pat. No. 6,507,279, titled "Complete Integrated Self-checkout System and Method", the entire disclosure of which is incorporated herein by reference, discloses a system in which electronic article surveillance (EAS) and/or radio frequency identification (RFID) are integrated together with a personal digital assistant (PDA) of a consumer/shopper to provide for self-checkout by the shopper, to track the shopper through a store and record parameters such as the shopper's track through the store, the time spent in various location in the store, and items selected by the shopper and items purchased. A database of the shopper's habits, which includes the information recorded while in the store during past trips, is input into a decision program that determines content of advertisements and product pricing that are displayed to the shopper through the PDA or other display devices located within the store. Although U.S. Pat. No. 6,507,279 generally discusses monitoring shelf items selected by the shopper through the use of RFID technology or bar-code scanning with the shopper's PDA, it does not disclose system components that allow the contents of a shopper's shopping cart or basket to automatically be recorded/updated as the shopper places items in the cart or basket. In addition, although the system of U.S. Pat. No. 6,507,279 does allow shoppers the interactive capability to request additional information about items in the store, it does not provide shoppers a fully interactive shopping experience in which the shoppers can compare items available in the store with the shoppers' predetermined shopping needs/desires. Moreover, the system of U.S. Pat. No. 6,507,279 does not provide shoppers the security and/or privacy that many consumers currently desire.

SUMMARY OF THE INVENTION

In accordance with an embodiment of the present invention, an interactive shopping system includes a basket (such as a shopping cart) for holding items selected by a shopper; a unique identifier for said basket; an input device associated with said basket, said input device being capable of obtaining information regarding specific items as said items are placed in said basket; and a point of sale system associated with said input device, said point of sale system being capable of collecting said information obtained from said input device, associating said information with said unique identifier for said basket, and completing a purchase transaction for all items located in said basket at checkout.

In various embodiments of the invention, the unique identifier may be an RFID tag. Further, an identification code displayed on the basket may be associated with the RFID tag. The point of sale system may include a database that associates the identification code with the RFID tag. In these or other embodiments, the point of sale system may further include a shopper access device, such as a PDA, that accesses the database, for example via a wired and/or wireless local area network (LAN) and/or wide area network (WAN) to which the database and/or the shopper access device is communicatively coupled. The database may include information regarding specific items as those items are placed in the basket and the shopper access device may include a comparison application to compare a shopping list accessible to the shopper access device with those items placed in the basket.

The input device associated with the basket may be an RFID reader, or simply an RFID antenna attached to the basket, in which instance an RFID reader may power the RFID antenna from a location remote from the basket. Alternatively, the input device may be a bar code scanner or even a camera and associated control identification software of a shopper's PDA.

In accordance with further embodiments of the invention, a shopper is provided an interactive shopping experience at a brick-and-mortar location of a merchant. This interactive experience may include being provided a basket (e.g., a shopping cart) for holding items selected by the shopper; locating a unique identifier on the basket; obtaining, through an input device, information regarding specific items as those items are placed in the basket; collecting and associating the information obtained through the input device with the unique identifier for the basket; and completing, through a point of sale system, a purchase transaction for all of the items located in the basket at checkout.

In instances where the unique identifier is an RFID tag, an identification code displayed on the basket may be associated with the RFID tag. The point of sale system may include a database that associates the identification code with the RFID tag, and may further include a shopper access device (for example, a PDA) that accesses the database via a wired and/or wireless LAN and/or WAN to which the database and the shopper access device are communicatively coupled. Such LANs/WANs may include wireless communication connections compliant with the IEEE 802.11 family of standards for same (a.k.a. Wi-Fi connections) and/or cellular connections to/from the shopper access device.

The database may include information regarding specific items as those items are placed in the basket. The shopper access device may access the database and use a comparison application to compare a shopping list accessible to the shopper access device with the items placed in the basket.

As indicated above, the input device associated with the basket may be an RFID reader, or simply an RFID antenna attached to the basket, in which instance an RFID reader may power the RFID antenna from a location remote from the basket.

The foregoing features of embodiments of the present invention are intended to be illustrative thereof and are not meant in a limiting sense. Many possible embodiments of the invention may be made and will be readily evident upon a study of the following specification and accompanying drawings comprising a part thereof. Various features and sub combinations of features may be employed without reference to other features and sub combinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

Illustrative embodiments of the present invention are set forth by way of example, and not limitation, in the figures of the accompanying drawings, in which.

DETAILED DESCRIPTION

The following description is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
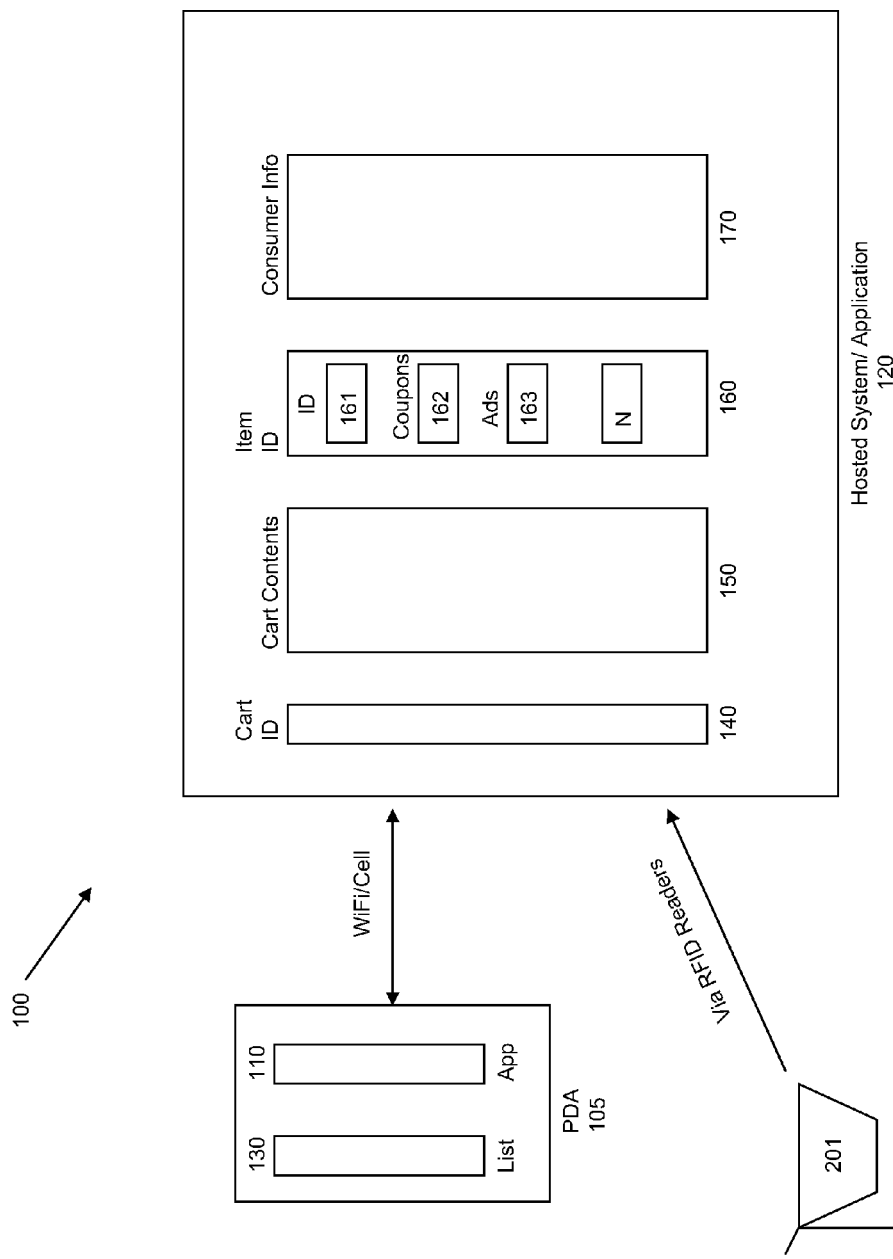
FIG. 1 is a schematic diagram of an interactive shopping system configured in accordance with an embodiment of the instant invention.

The present inventor has recognized that it is desirable to provide improved and/or additional shopping tools to further enhance a shopper's shopping experience and/or security/privacy, and to provide improved and/or additional shopping tools to further enhance a shoppers shopping experience and/or security/privacy that also benefit the merchant in such ways as providing increased security and/or improved inventory management. Accordingly, FIG. 1 illustrates an example of interactive shopping system 100 configured in accordance with an embodiment of the instant invention for use in connection with a brick-and-mortar shopping environment, such as a retail environment such as Wal-Mart. In the system shown in FIG. 1, every product in the shopping environment is enabled with a respective RFID tag. The shopping carts 201 are configured with RFID antennas to harness and amplify RFID energy (including, but not limited to those described in U.S. Application No. 61/086,925 incorporated herein by reference in its entirety), or with RFID readers themselves. Each shopping cart further includes an RFID tag or other unique identifier for that cart. A consumer (shopper) downloads and installs on his/her PDA 105 an application 110 that allows the consumer to interact with a hosted application 120 owned or operated by the retail store. The consumer is able to type up a shopping list 130 which is stored in a database or other suitable storage location on or accessible by the PDA before entering the store, using the application installed on the PDA. In same cases, the application on the PDA accesses one or more databases accessible through the hosted application through a remote network connection (such as a cellular or other WAN connection) before the consumer ever actually enters the store (e.g., when the consumer is still at home). This allows the consumer to obtain information regarding product availability, coupons, pricing, etc., stored in a database 160 (or multiple databases 161, 162, 163, . . . , N, separately including product identification/UPC information, coupons, advertisements, etc., which multiple databases may be part of a single database 160 or which may be separate and apart from database 160) accessible by the hosted application as the consumer is preparing for a shopping trip. Once at the store, the PDA uses a wireless (e.g., a Wi-Fi) network of the retailer (or a cellular or other connection) to register in a secure network with the store in which the consumer is shopping. The consumer enters a unique number (or other identifier) 320 posted on the shopping cart 201 that the consumer is using into the consumer's PDA. This unique number corresponds to a unique RFID tag located on the shopping cart, which information is stored in database 140 accessible by hosted application 120. Using the consumer's shopping list, the application on the PDA can query database 160 (or other databases) through the hosted application for directions to products within the store, query for coupons, advertisements, pricing or suggestions on other items that may interest the customer. The PDA application can also receive notifications of products that are on the shopping list but which are out of stock, and may also include information such as expected shipment date, pricing, etc. that is stored in database 160 (or in other databases).

In some cases, information regarding the consumer may be stored in database 170. This may include information provided by the consumer during the registration process such as a name, address, password (if required by the system), etc., as well as information regarding the consumer's shopping preferences and information tracked through the system of the instant invention regarding the consumer's actual purchases and/or queries of the system. In addition or in other instances, database 170 may include preferred payment information (such as a credit card number) of the consumer, to allow for quicker and easier checkout. In one particular instance, database 170 is part of a centralized customer information management system which is a part of hosted application 120, or alternatively which works in combination with hosted application 120. In such an embodiment, the centralized customer information management system described in U.S. application Ser. No. 12/187,193, the entire disclosure of which is incorporated herein by reference, may be utilized in the system of the instant invention.

As the customer shops in the store, the RFID reader, or RFID antennas being powered by an external RFID reader, reads the contents of the shopping cart as items are placed in the cart. This information is stored in internal database 150 of the hosted application which is keyed by the unique shopping cart number. The application on the PDA queries the hosted application and obtains information regarding the content of the shopping cart and displays such information to the consumer. As items from the consumer's shopping list are placed into the cart, the application on the PDA can mark the item as being fulfilled on the list and generate an appropriate identifier via the PDA display to the consumer that the item is fulfilled (i.e., a check mark by the item on the shopping list display, or a different color font, etc.). In alternative embodiments, the items being selected by the consumer include bar codes. In some such embodiments, the bar codes are used instead of RFID tags. In other embodiments, items include both RFID tags and bar codes. The bar codes printed on the items allow the consumer to scan the bar code using the camera function of the consumer's PDA. The software application on the PDA optically recognizes the bar code scanned into the PDA and then accesses the hosted application to update the database regarding the contents of the shopping cart and/or to provide the consumer with requested information regarding the item. In one embodiment in which items include both RFID tags and bar codes, the contents of the shopping cart are updated automatically in internal database 150 in the manner discussed above through the use of the RFID reader, and the bar code is scanned by the consumer when the consumer desires to obtain information regarding a specific item. In such an embodiment, the consumer scans the bar code with the PDA, and the PDA accesses the hosted application to obtain information regarding the item (such as coupons, price, ingredients, nutrition, etc.), that is stored in a database of the hosted application. That information is uploaded to the PDA and displayed to the consumer.

In some cases, a consumer can opt in to receive coupons for products electronically via the consumer's PDA. In one such embodiment, after the consumer creates a shopping list or adds a certain item to the list, the application on the PDA accesses a database of the hosted application to download coupons for the same or similar items. In this or other instances, as the consumer places items in the consumer's shopping cart and the database that tracks the items in the cart is updated, the hosted application automatically checks a coupon database accessible by the hosted application to see if any coupons exist for such items, and if a coupon exists uploads that coupon to the consumer's PDA for use by the consumer in completing the purchase transaction. In still another embodiment, coupons may be periodically and/or randomly sent to the consumer's PDA. In one such embodiment, coupons that are sent to a consumer can be targeted to the consumer based upon the consumer's past purchasing habits, which are maintained in a database accessible by the hosted application.

Figure 2:
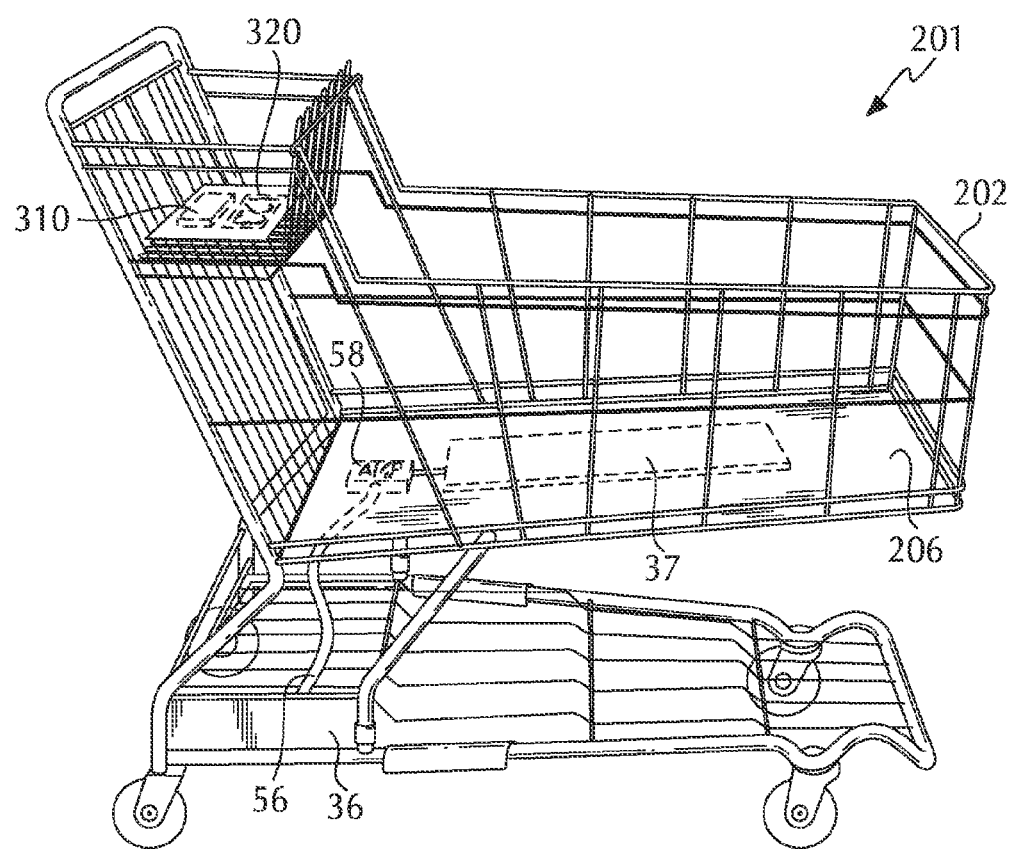
FIG. 2 is a side elevation view of a shopping cart configured in accordance with an embodiment of the instant invention.

FIG. 2 is a side elevation view of a cart/basket apparatus 201 configured in accordance with an embodiment of the instant invention. Apparatus 201 includes a shopping cart 202. An intermediate apparatus of the type described in U.S. Application 61/086,925 is supported on the shopping cart 202, including panel antennas 36 and 37, a cable 56, and a bidirectional amplifier 58. The amplifier is optional, and could be omitted. A plastic sheet or panel 206 rests on top of the wire mesh that defines the bottom wall of the basket of the shopping cart. The amplifier 58, the antenna 37 and a portion of the cable 56 are embedded within the plastic panel 206, such that the antenna 37 extends approximately horizontally. The antenna 36 is supported on a lower portion of the shopping cart near one of the rear wheels. The antenna 36 is oriented so that it extends vertically, and extends approximately parallel to the direction of forward travel of the shopping cart.

One possible scenario for use of the shopping cart 202 is that, when a shopper is ready to check out and enters a checkout aisle at a point-of-sale (POS) terminal, a stationary, not-illustrated reader disposed near the floor on one side of the aisle (including, but not necessarily limited to the system described in U.S. application Ser. No. 12/197,028 the entire disclosure of which is incorporated herein by reference) transmits wireless signals that are collected and amplified by the antenna 36, that propagate through the cable 56, that are further amplified by the amplifier 58, and that are then rebroadcast by the antenna 37. Not-illustrated products within the basket of the shopping cart 202 would carry not-illustrated tags similar to the tag 14 shown in FIG. 2. The tags on the products within the basket would receive the wireless signals rebroadcast by the antenna 37, and would then produce wireless signals. The signals from the tags might be strong enough to travel directly to the reader. Alternatively, the signals from the tags could be collected and amplified by the antenna 37, propagate through the cable 56 and be further amplified by the amplifier 58, and then be rebroadcast by the antenna 37 for travel to the reader. In either case, the products within the shopping cart can be automatically and reliably inventoried.

It will be appreciated that in place of, or in addition to, the reader located at the POS terminal in the scenario described above, in a preferred embodiment of the instant invention readers are located throughout the store in a manner that essentially provides constant communication between cart apparatus 201 and hosted system 120. Furthermore, in a preferred embodiment, cart apparatus 201 includes RFID tag 310 attached to or embedded into cart 202 and identification number 320 posted on the cart which is associated with the RFID tag's unique identification information in database 140. This allows database 150 to be continuously (in real time or near real time) updated with the contents of cart 201 as items are placed in or removed from cart 201. In this manner, the exact contents of any cart within the store, and the specific cart in which those contents are located, can be obtained at any time. This allows the hosted application to communicate cart contents information with the PDA of the consumer.

The present interactive shopping cart system may include security protocols to prevent unauthorized persons (i.e., anyone other than the specific consumer that is using a specific cart, or a system administrator or other authorized user of hosted system 120) from obtaining information regarding the contents of a cart. For example, a special network key, such as a rolling fob code, that is associated with each cart, may be displayed along with the unique identifier (or is displayed as the unique identifier) of the cart and may be required to be entered by the consumer during registration at the store. Once the consumer is registered, the fact that a consumer is registered with a particular cart is stored in database 140 (or another database), and the hosted application will prevent other users from registering the same cart until after the consumer is no longer registered with that cart. In other instances, the consumer may be required to register at the store with the hosted application utilizing the stores LAN/WiFi connection; this ensures that the consumer is actually at the store location and is not trying to access cart information remotely.

In another embodiment of the instant invention, each cart includes a port or other connection in which the consumer's PDA may be plugged directly into the cart. The port provides power for charging the PDA that is generated based upon motion of the cart, or which is otherwise provided by a power supply located in the cart. In addition, the port may be connected to a processor located within the cart that communicates with the hosted application and which provides the communication link between the consumer's PDA and the hosted application. This ensures that only the consumer utilizing a particular cart may access information regarding the contents of the cart which are stored in database 150.

In another embodiment of the instant invention, a theft prevention system and/or item identification assistance system may be utilized at the point of sale. In one such embodiment, a theft prevention system of the type described in U.S. application Ser. No. 11/837,818, the entire disclosure of which is incorporated herein by reference, may be so utilized. It should be appreciated that the theft system may be a separate application that works in combination with hosted application 120, or may be incorporated into hosted application 120. In another embodiment, the item identification system of U.S. Application Ser. No. 60/996,262, the entire disclosure of which is incorporated herein by reference, is utilized in the system. It should be appreciated that the identification system may be a separate application that works in combination with hosted application 120, or may be incorporated into hosted application 120.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the invention is not limited to the exact details shown or described.

Although the foregoing detailed description of the present invention has been made with reference to various illustrated embodiments thereof, and the best mode contemplated for carrying out the present invention has been shown and described, it should be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A interactive shopping system, comprising:
   a basket for holding items selected by a shopper;
   a unique identifier disposed on said basket;
   an input device associated with said basket, said input device being configured for obtaining information regarding specific items as said items are placed in said basket, the input device further configured to communicate the stored information to a point-of-sale system to complete a purchase transaction for all items located in said basket at checkout; and
   a hosted system being configured for collecting said information obtained from said input device and associate said information with said unique identifier for said basket, said hosted system further being configured to enable the shopper to use a personal digital assistant (PDA) to access the hosted system and view information of the items placed in said basket.

2. The system as claimed in claim 1 wherein said unique identifier comprises a radio frequency identification (RFID) tag.

3. The system as claimed in claim 2 wherein said unique identifier further comprises an identification code displayed on said basket and associated with said RFID tag.

4. The system as claimed in claim 3 wherein said hosted system includes a database that associates said identification code with said RFID tag.

5. The system as claimed in claim 4 wherein said hosted system further includes a shopper access device that accesses said database.

6. The system as claimed in claim 5 wherein said shopper access device comprises the PDA.

7. The system as claimed in claim 5 wherein said shopper access device accesses said database via a local area network (LAN) to which said database is communicatively coupled.

8. The system as claimed in claim 7 wherein said LAN includes a Wi-Fi connection to said shopper access device.

9. The system as claimed in claim 5 wherein said shopper access device accesses said database via a wide area network (WAN) connection to said database.

10. The system as claimed in claim 9 wherein said WAN connection includes a cellular connection to said shopper access device.

11. The system as claimed in claim 4 wherein said database includes said information regarding specific items as said items are placed in said basket.

12. The system as claimed in claim 11 wherein said hosted system includes a shopper access device that accesses said database, said shopper access device including a comparison application to compare a shopping list accessible to said shopper access device with said items placed in said basket.

13. The system as claimed in claim 1 wherein said basket comprises a shopping cart.

14. The system as claimed in claim 1 wherein said input device comprises an RFID reader.

15. The system as claimed in claim 14 wherein said input device further comprises an RFID antenna attached to said basket.

16. The system as claimed in claim 15 wherein said RFID reader powers said RFID antenna from a location remote from said basket.

17. The interactive shopping system according to claim 1, wherein said input device is further configured to automatically determine items being removed from said basket and remove information of those items from being stored.

18. The system according to claim 1, wherein said hosted system is further configured to enable the shopper to input preferred payment information for payment of items being purchased.

19. The system according to claim 1, wherein said hosted system is further configured to automatically determine if a coupon is available for any of the items placed in said basket and enable the shopper to view available coupons.

20. The system according to claim 1, wherein said basket includes a bottom portion on which the items are placed, and wherein said input device includes an antenna disposed on top of the bottom portion of said basket to enable reading of the information on the items placed thereon.

21. The system according to claim 1, further comprising a plurality of readers disposed throughout a shopping environment to enable communication of the information being stored by said input device and said unique identifier to enable said hosted system to update the information associated with the unique identifier as the shopper traverses a shopping environment.

22. A method of providing a shopper an interactive shopping experience at a brick-and-mortar location of a merchant, said method comprising:
   providing the shopper a basket for holding items selected by a shopper at the brick-and-mortar location;
   locating a unique identifier on said basket;

obtaining through an input device information regarding specific items as said items are placed in said basket;

collecting said information obtained through said input device;

associating said information with said unique identifier for said basket;

enabling the shopper to use a personal digital assistant (PDA) to access the information of the items placed in said basket; and completing through a point of sale system a purchase transaction for all items located in said basket at checkout.

23. The method as claimed in claim 22 wherein said unique identifier comprises an RFID tag.

24. The method as claimed in claim 23 wherein said unique identifier further comprises an identification code displayed on said basket and associated with said RFID tag.

25. The method as claimed in claim 24 wherein said point of sale system includes a database that associates said identification code with said RFID tag.

26. The method as claimed in claim 25 wherein said point of sale system further includes a shopper access device that accesses said database.

27. The method as claimed in claim 26 wherein said shopper access device comprises the PDA.

28. The method as claimed in claim 26 wherein said shopper access device accesses said database via a LAN to which said database is connected.

29. The method as claimed in claim 28 wherein said LAN includes a Wi-Fi connection to said shopper access device.

30. The method as claimed in claim 26 wherein said shopper access device accesses said database via a WAN connection to said database.

31. The method as claimed in claim 30 wherein said WAN connection includes a cellular connection to said shopper access device.

32. The method as claimed in claim 25 wherein said database includes said information regarding specific items as said items are placed in said basket.

33. The method as claimed in claim 32 wherein said point of sale system includes a shopper access device that accesses said database, said shopper access device including a comparison application to compare a shopping list accessible to said shopper access device with said items placed in said basket.

34. The method as claimed in claim 22 wherein said basket comprises a shopping cart.

35. The method as claimed in claim 22 wherein said input device comprises an RFID reader.

36. The method as claimed in claim 35 wherein said input device further comprises an RFID antenna attached to said basket.

37. The method as claimed in claim 36 wherein said RFID reader powers said RFID antenna from a location remote from said basket.

38. The method according to claim 22, further comprising automatically determining that an item placed in said basket is removed from said basket and removing information of those items from being stored.

* * * * *